US010562388B2

United States Patent
Yagyu et al.

(10) Patent No.: US 10,562,388 B2
(45) Date of Patent: Feb. 18, 2020

(54) PARALLEL HYBRID POWER TRANSMISSION MECHANISM

(71) Applicant: KUBOTA CORPORATION, Osaka-shi, Osaka (JP)

(72) Inventors: Sumio Yagyu, Sakai (JP); Kazuto Okazaki, Sakai (JP)

(73) Assignee: KUBOTA CORPORATION, Osaka-Shi, Osaka (JP)

( * ) Notice: Subject to any disclaimer, the term of this patent is extended or adjusted under 35 U.S.C. 154(b) by 284 days.

(21) Appl. No.: 15/319,133

(22) PCT Filed: Jun. 9, 2015

(86) PCT No.: PCT/JP2015/066590
§ 371 (c)(1),
(2) Date: Dec. 15, 2016

(87) PCT Pub. No.: WO2015/194419
PCT Pub. Date: Dec. 23, 2015

(65) Prior Publication Data
US 2017/0129322 A1    May 11, 2017

(30) Foreign Application Priority Data

Jun. 16, 2014 (JP) .................................. 2014-123417

(51) Int. Cl.
*B60K 6/485* (2007.10)
*B60K 6/405* (2007.10)
(Continued)

(52) U.S. Cl.
CPC ................ *B60K 6/485* (2013.01); *B60K 6/26* (2013.01); *B60K 6/40* (2013.01); *B60K 6/405* (2013.01);
(Continued)

(58) Field of Classification Search
CPC .......... H02K 7/02; H02K 7/003; H02K 21/22; H02K 21/222
(Continued)

(56) References Cited

U.S. PATENT DOCUMENTS 5,617,940 A * 4/1997 Fukushima ....... F16F 15/13107
192/208
6,209,692 B1 * 4/2001 Pels ....................... B60K 6/485
188/381

(Continued)

FOREIGN PATENT DOCUMENTS

DE       19631384 C1    10/1997
EP       0106383 A1     4/1984
(Continued)

OTHER PUBLICATIONS

English translation, JP2008290594 (Year: 2019).*
Extended European Search Report for European Application No. 15809098.5, dated Mar. 22, 2018.

*Primary Examiner* — Nguyen Tran
(74) *Attorney, Agent, or Firm* — Birch, Stewart, Kolasch & Birch, LLP

(57) ABSTRACT

A rotary tilling apparatus separates a power transmission system starting from a flywheel to a passive movement device through an elastic coupler from another power transmission system starting from the flywheel to a rotor of a motor generator, and thereby reduces a load applied to the rotor and prevents the power transmission system of the passive movement device from providing a negative effect to an engine and the rotor. A parallel hybrid power transmission mechanism includes an engine, a crank shaft disposed on the engine, a motor generator, a passive movement device configured to receive a motive power of the motor generator, an input shaft disposed on the passive movement device, a flywheel coupled to the crank shaft, an elastic (Continued)

coupler configured to couple the flywheel to the input shaft, and a rotor disposed on the motor generator and coupled to the fly wheel.

6 Claims, 1 Drawing Sheet

(51) Int. Cl.
    *F16H 33/02*     (2006.01)
    *H02K 7/02*     (2006.01)
    *B60K 6/40*     (2007.10)
    *H02K 7/18*     (2006.01)
    *B60K 25/02*     (2006.01)
    *B60L 50/10*     (2019.01)
    *B60L 50/30*     (2019.01)
    *B60K 6/26*     (2007.10)
    *F16F 15/315*     (2006.01)

(52) U.S. Cl.
    CPC .............. *B60K 25/02* (2013.01); *B60L 50/10* (2019.02); *B60L 50/30* (2019.02); *F16F 15/3153* (2013.01); *F16H 33/02* (2013.01); *H02K 7/02* (2013.01); *H02K 7/18* (2013.01); *H02K 7/1807* (2013.01); *B60Y 2200/92* (2013.01); *B60Y 2400/162* (2013.01); *Y02T 10/6226* (2013.01); *Y10S 903/906* (2013.01); *Y10S 903/952* (2013.01)

(58) Field of Classification Search
    USPC .................................................. 310/74, 153
    See application file for complete search history.

(56) References Cited

U.S. PATENT DOCUMENTS

| | | |
|---|---|---|
| 2004/0209532 A1 | 10/2004 | Mori et al. |
| 2009/0302720 A1 | 12/2009 | Chiba |
| 2014/0026551 A1 | 1/2014 | Hirozawa et al. |

FOREIGN PATENT DOCUMENTS

| | | |
|---|---|---|
| JP | 2003-81189 A | 3/2003 |
| JP | 2008-290594 A | 12/2008 |
| JP | 2009-184665 A | 8/2009 |
| JP | 2010-221775 A | 10/2010 |
| JP | 2010-261554 A | 11/2010 |
| JP | 4646983 B2 | 3/2011 |
| JP | 2012-71731 A | 4/2012 |
| JP | 2012-223003 A | 11/2012 |
| JP | 2014-83869 A | 5/2014 |

\* cited by examiner

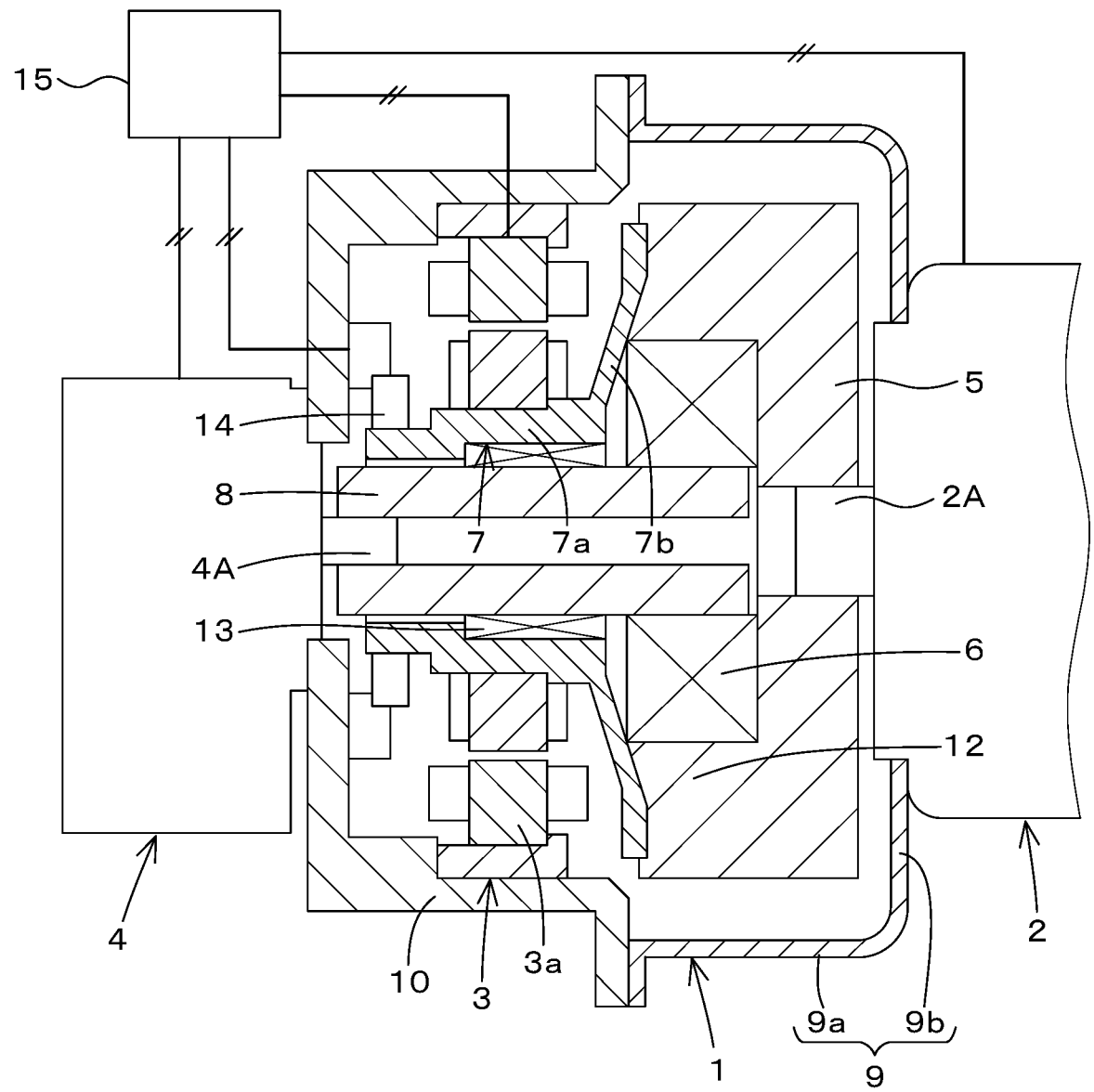

PARALLEL HYBRID POWER TRANSMISSION MECHANISM

TECHNICAL FIELD

The present invention relates to a parallel hybrid power transmission mechanism for transmitting a motive power that is obtained by combining a motive power of a motor generator and a motive power of an engine.

BACKGROUND ART

In a parallel hybrid power transmission mechanism combining a motor generator and an engine, a motive power is transmitted by jointing a crank shaft of an engine, a rotor of a motor generator, an input shaft of a passive movement device in sequence as shown in patent documents 1 and 2. In this manner, (1) a motive power of the engine is transmitted to the passive movement device through the rotor of the motor generator, (2) a motive power of the motor generator is transmitted directly from the rotor to the passive movement device, and thus the motive powers of two systems both are transmitted through the rotor of the motor generator.

In addition, a clutch device is arranged between the engine and the passive movement device, and the arrangement thereby absorbs the torsional vibration generated depending on a relation between the engine and the passive movement device and thus smoothly transmits the motive power.

RELATED ART DOCUMENTS

Patent Documents

[Patent document 1] Japanese Unexamined Patent Application Publication No. 2010-261554.
[Patent document 2] Japanese Unexamined Patent Application Publication No. 2014-83869.
[Patent document 3] Japanese Patent Publication No. 4646983.

DISCLOSURE OF THE INVENTION

Problems to be Solved by the Invention

The conventional technique mentioned above transmits not only the motive power of the motor generator but also the motive power of the crank shaft of the engine to the passive movement device through the rotor of the motor generator. In this manner, the rotor transmits both of the motive powers, and thus requires an excessive strength.

In addition, a hydraulic pump is often employed as the passive movement device of an industrial machine and however widely fluctuates the torque depending on fluctuations of a required motive power, and thus the torsional vibration of a power transmission system may be transmitted to an engine under a state where a clutch device is in an engaged state, the torsional vibration being generated by the fluctuations of the torque. In addition, the torsional vibration will interfere with the smooth power transmission when a distance between the engine and the hydraulic pump is large.

The motor generator is driven under the vector control, and thus a revolution signal outputted from a revolution detection device (resolver) will vibrate when the torsional vibration is applied to the rotor, the revolution detection device being disposed on the rotor. In this manner, the motor inverter is controlled unstably, and thus the motor inverter may step out, and further the power control may be difficult.

On the other hand, another parallel hybrid power transmission mechanism is also known, the parallel hybrid power transmission mechanism having a structure disposing a flywheel integrally on a crank shaft of an engine and coupling the flywheel to a rotor of a motor generator. However, in the case where the rotor is coupled to the flywheel, a revolution accuracy may be deteriorated due to vibration of a surface of the flywheel and vibration of a core of the flywheel. The deterioration of the revolution accuracy of the rotor is not preferable because the deterioration fluctuates an air gap between a stator of the motor generator and the rotor of the motor generator and thus fluctuates an output of the motor generator. Patent document 3 mentioned above proposes a technique of solving the problems mentioned above.

That is, the technique disclosed in patent document 3 supports the rotor on a motor housing, the rotor being capable of revolving, and couples the rotor to the flywheel in the spline coupling manner by a cylindrical shaft portion, thereby suppressing deterioration of the revolution accuracy of the rotor. However, negative effects such as the torsional vibration is transmitted to the rotor through the spline coupling, the torsional vibration being generated by the torque fluctuation transmitted from the passive movement device (a hydraulic pump and the like), that is a problem. In particular, the technique disclosed in patent document 3 is incapable of avoiding the negative effect given to the rotor by the torsional vibration and the like generated due to the torque fluctuation transmitted from the passive movement device and further suppressing the fluctuation of the air gap between the rotor and the stator of the motor generator.

The present invention intends to provide a parallel hybrid power transmission mechanism that solved the problems of the conventional technique described above.

The present invention intends to provide a parallel hybrid power transmission mechanism configured to separate a motive power transmission system starting from a flywheel to a passive movement device through an elastic coupler from another power transmission system starting from the flywheel to a rotor of a motor generator, and thereby reducing a load applied to the rotor and preventing the power transmission system of the passive movement device from providing an negative effect to an engine and the rotor. In addition, the present invention intends to provide a parallel hybrid power transmission mechanism capable of suppressing fluctuation of an air gap between a stator of the motor generator and the rotor of the motor generator.

[Means of Solving the Problems]

To solve the above-mentioned technical problems, concrete techniques that the present invention provides are characterized as follows.

In a first aspect of the present invention, a parallel hybrid power transmission mechanism includes an engine 2, a crank shaft 2A disposed on the engine 2, a motor generator 3, a passive movement device 4 configured to receive a motive power of the motor generator 3, an input shaft 4A disposed on the passive movement device 4, a flywheel 5 coupled to the crank shaft 2A, an elastic coupler 6 configured to couple the flywheel 5 to the input shaft 4A, and a rotor 7 disposed on the motor generator 3 and coupled to the fly wheel 5.

In a second aspect of the present invention, the parallel hybrid power transmission mechanism includes an intermediate shaft 8 coupling the elastic coupler 6 to the input shaft 4A. The rotor 7 includes a rotor boss 7a having a hollow shape, and the rotor boss 7a is arranged on an outside of a diameter of the intermediate shaft 8.

In a third aspect of the present invention, the parallel hybrid power transmission mechanism includes an intermediate bearing 13 configured to support the rotor boss 7a on the intermediate shaft 8 and to revolve the rotor boss 7a. The intermediate shaft 8 is coupled to the flywheel 5 by the elastic coupler 6.

In a fourth aspect of the present invention, the parallel hybrid power transmission mechanism includes a flywheel housing 9 surrounding the flywheel 5, a motor housing 10 surrounding the motor generator 3 and being coupled to the flywheel housing 9 with an inside space opposed to the flywheel housing 9, a circular portion 12 disposed on a circumferential side of the flywheel 5, the circular portion 12 being attached to an outer circumference of the elastic coupler 6, and a flange portion 7b disposed on an end portion of the rotor 7, the flange portion 7b projecting toward an outside of a diameter of the rotor 7. The flange portion 7b is coupled to the circular portion 7b.

In a fifth aspect of the present invention, the parallel hybrid power transmission mechanism includes a revolution detection device 14 configured to detect a revolution phase of the rotor 7.

Effects of the Invention

The present invention separates a power transmission system starting from a flywheel to a passive movement device through an elastic coupler from another power transmission system starting from the flywheel to a rotor of a motor generator, and thereby reducing a load applied to the rotor and preventing the power transmission system of the passive movement device from giving an negative effect to an engine and the rotor.

That is, a parallel hybrid power transmission mechanism includes an engine 2, a crank shaft 2A disposed on the engine 2, a motor generator 3, a passive movement device 4 configured to receive a motive power of the motor generator 3, an input shaft 4A disposed on the passive movement device 4, a flywheel 5 coupled to the crank shaft 2A, an elastic coupler 6 configured to couple the flywheel 5 to the input shaft 4A, and a rotor 7 disposed on the motor generator 3 and coupled to the fly wheel 5. Thus, the motive power of the engine 2 does not pass through the rotor 7, and the motive power from the flywheel 5 can be transmitted to the passive movement device 4 in a first power transmission system that is configured to be a short distance system in a directly-coupling manner. In addition, the motive power from the flywheel 5 can be transmitted to the rotor 7 of the motor generator 3 in the second power transmission system. And, the motive power of the rotor 7 of the motor generator 3 also can assist the motive power of the engine 2 in the first motive power transmission. Thus, the interference between the power transmission systems is eliminated, the rotor 7 transmits only the motive power of the motor generator 3, and thus a load to be supported by the rotor 7 can be reduced. In addition, the negative effects such as the torsional vibration is absorbed by the elastic coupler 6, the torsional vibration being generated by the torque fluctuation transmitted from the passive movement device 4, and thus the negative effects can be separated by the flywheel 5. In this manner, the negative effects given to the engine 2 and the motor generator 3 can be reduced, and thus noises of in-vehicle devices can be reduced in an automobile and the like.

In addition, the parallel hybrid power transmission mechanism includes an intermediate shaft 8 coupling the elastic coupler 6 to the input shaft 4A. The rotor 7 includes a rotor boss 7a having a hollow shape, and the rotor boss 7a is arranged on an outside of a diameter of the intermediate shaft 8. In this manner, the engine 2, the motor generator 3, and the passive movement device 4 can be arranged compactly, a distance from the flywheel 5 to the passive movement device 4 can be shortened further, and thereby providing a compact configuration. In this manner, the negative effects given from the passive movement device 4 to the engine 2 and the motor generator 3 can be reduced further.

In addition, the parallel hybrid power transmission mechanism includes an intermediate bearing 13 configured to support the rotor boss 7a on the intermediate shaft 8 and to revolve the rotor boss 7a. The intermediate shaft 8 is coupled to the flywheel 5 by the elastic coupler 6. In this manner, the rotor 7 can be supported with a high revolution accuracy. That is, the intermediate shaft 8 is coupled to the flywheel 5 by the elastic coupler 6, and thus the revolution accuracy of the intermediate shaft 8 can be improved. And, the rotor 7 is configured to be supported and revolved by the intermediate bearing 13 with respect to the intermediate shaft 8 having the high revolution accuracy, and thus the high revolution accuracy of the rotor 7 can be maintained. In this manner, fluctuation of an air gap between a stator 3a of the motor generator 3 and the rotor 7 of the motor generator 3 can be suppressed.

In addition, the parallel hybrid power transmission mechanism includes a flywheel housing 9 surrounding the flywheel 5, a motor housing 10 surrounding the motor generator 3 and being coupled to the flywheel housing 9 with an inside space opposed to the flywheel housing 9, a circular portion 12 disposed on a circumferential side of the flywheel 5, the circular portion 12 being attached to an outer circumference of the elastic coupler 6, and a flange portion 7b disposed on an end portion of the rotor 7, the flange portion 7b projecting toward an outside of a diameter of the rotor 7. The flange portion 7b is coupled to the circular portion 7b. In this manner, both of the motive power of the engine 2 and the motive power of the motor generator 3 can be transmitted to the passive movement device 4 through the flywheel 5 and the elastic coupler 6. In addition, the negative effects such as the torsional vibration from the passive movement device 4 can be absorbed or separated not to be transmitted to the engine 2 and the motor generator 3.

In addition, the parallel hybrid power transmission mechanism includes a revolution detection device 14 configured to detect a revolution phase of the rotor 7. In this manner, the motive power of the motor generator 3 can be controlled stably in combination with the elastic coupler 6 separating the rotor 7 from the negative effects such as the torsional vibration from the passive movement device 4.

BRIEF DESCRIPTION OF THE DRAWINGS

FIG. 1 is a cross section view illustrating an embodiment of the present invention.

MODE FOR CARRYING OUT THE INVENTION

Referring to drawings, an embodiment of the present invention will be described below.

A parallel hybrid power transmission mechanism 1 illustrated in FIG. 1 is employed in an automobile and an industrial machine such as an agricultural machine, a construction machine, and a utility vehicle. The parallel hybrid power transmission mechanism 1 transmits a motive power of the engine 2 and a motive power of the motor generator 3 to a passive movement device 4 alternatively or in combination.

An engine 2 is a diesel engine, a gasoline engine, or the like. A flywheel 5 is coupled to a crank shaft 2A that is disposed on the engine 2, the flywheel 5 having a high mass. The flywheel 5 is surrounded by a flywheel housing 9.

The flywheel housing 9 includes an outer circumference portion 9a and a side wall 9b. The outer circumference portion 9a is disposed on an outside of a diameter of the flywheel 5. The side wall 9b is disposed on an end portion of the outer circumference portion 9a, the end portion being on a side close to the engine 2. An inside of the flywheel housing 9 is a space surrounded by the outer circumference portion 9a and the side wall 9b. The side wall 9b is fixed on the engine 2. A motor housing 10 is fixed to another end portion of the outer circumference portion 9a, the another end portion being opposite to the above-mentioned end portion being on a side close to the engine 2.

The motor housing 10 surrounds the motor generator 3. A stator 3a is fixed to an inner circumference portion of the motor housing 10. The stator 3a is constituted of laminated steels, and a coil is wound on the stator 3a The rotor 7 is arranged on an inside of a diameter of the stator 3a. An inside space of the stator 3a and an inside space of the motor housing 10 are opposed to an inside space of the motor housing 10 and communicate to the inside space of the motor housing 10. An end portion of the rotor 7 is coupled to an end portion of the flywheel 5.

The rotor 7 is disposed on the motor generator 3, and is coupled to the flywheel 5. The rotor 7 includes a rotor boss 7a having a hollow shape (a cylindrical shape). Laminated steels are fitted on an outer circumference of the rotor boss 7a, and permanent magnets are embedded in the laminated steels. An end portion of the rotor boss 7a forms a flange portion 7b extending (protruding) toward an outside of a diameter of the rotor boss 7a, the end portion being on a side close to the flywheel 5. An outer circumference portion of the flange portion 7b is fastened to an end surface of a circular portion 12 of the flywheel 5 by a bolt.

The motor generator 3 meanwhile may be a synchronous motor other than a three-phase AC (Alternating Current) synchronous motor employing the embedded permanent magnets. For example, the motor generator 3 may be an AC motor, an DC motor, a synchronous motor including laminated steels on which a coil is wound, the laminated steels being fitted to the rotor 7, and the like.

The passive movement device 4 is a hydraulic pump for example, and a hydraulic pump of a hydrostatic transmission is exemplified concretely as the passive movement device 4. The passive movement device 4 is coupled to the motor housing 10 by a pump housing. In the embodiment, the intermediate shaft 8 is coupled to an input shaft 4A, the input shaft 4A being disposed on the passive movement device 4; however, the intermediate shaft 8 may be omitted if the input shaft 4A is configured to be a long shaft reaching close to the flywheel 5. The intermediate shaft 8 penetrates concentrically inside the rotor 7 having a hollow shape. A tip end of the intermediate shaft 8 is close to the flywheel 5.

An elastic coupler 6 is arranged between a side close to the tip end of the intermediate shaft 8 and the circular portion 12 of the flywheel 5. That is, the intermediate shaft 8 couples the input shaft 4A of the passive movement device 4 to the elastic coupler 6. The elastic coupler 6 is a coupler having rubber elasticity such as a center flex coupler. The elastic coupler 6 couples the flywheel 5 to the input shaft 4A of the passive movement device 4. The coupler 6 includes an inner circumference portion and an outer circumference portion, the inner circumference portion being fitted to the intermediate shaft 8, the outer circumference portion being fitted to the circular portion 12. The elastic coupler 6 is positioned in a direction of a diameter of the flywheel 5 by a positioning member (not shown in the drawings) such as a pin. In other words, the elastic coupler 6 is positioned arranging a center shaft of the elastic coupler 6 to be concentric with a center shaft of the flywheel 5. The elastic coupler 6 plays a role of transmitting the motive power from the flywheel 5 to the intermediate shaft 8 and absorbing or separating the torsional vibration and the like generated by fluctuation of a torque transmitted from the intermediate shaft 8 to a side of the flywheel 5.

The rotor 7 is coupled to the fly wheel 5. The intermediate shaft 8 is supported on the flywheel 5 by the elastic coupler 6. An intermediate bearing 13 such as a needle bearing is disposed between the rotor 7 and the intermediate shaft 8. The intermediate bearing 13 supports the rotor 7, and thereby the rotor 7 is capable of revolving with respect to the intermediate shaft 8. In this manner, the intermediate shaft 13 and the rotor 7 are supported with each other, and thereby preventing resonation.

The flywheel 5 is coupled to the passive movement device 4 by the intermediate shaft 8. In this manner, the connection between the flywheel 5 and the passive movement device 4 is a direct connection shorter than an in-direct connection coupled to the passive movement device 4 by the rotor 7. The rotor 7 is not directly coupled to the passive movement device 4, and is coupled to the passive movement device 4 by the flywheel 5 having a large inertial force and the elastic coupler 6 elastically deformable. Thus, the engine 2 and the motor generator 3 are capable of separate a negative effect transmitted from the passive movement device 4.

A revolution detection device 14 is disposed between the motor housing 10 fixing the pump housing and an end portion opposite to a side of the flange portion 7b of the rotor boss 7a. The revolution detection device 14 is a resolver, an encoder, and the like. The revolution detection device 14 is configured to detect a revolution phase of the rotor 7. The revolution detection device 14 is connected to a controller 15. The controller 15 includes an inverter to control the motor generator 3 under the vector control. It is preferred for the revolution detection device 14 to be a resolver in an automobile and an industrial machine, the resolver being configured to output an analog signal and have resistance to noise.

The controller 15 is connected to the engine 2, the motor generator 3, the passive movement device 4, and the like. The controller 15 controls the driving, the stopping, and the revolution speed of the engine 2, the motor generator 3, the passive movement device 4, and the like.

An operation of the parallel hybrid power transmission mechanism 1 will be explained next.

In the parallel hybrid power transmission mechanism 1, the revolution of the crank shaft 2A is transmitted to the flywheel 5 when the engine 2 is driven. In addition, the revolution of the crank shaft 2A is transmitted through the elastic coupler 6 from the flywheel 5 to the intermediate shaft 8 and the input shaft 4A of the passive movement device 4 (in the first power transmission system), and thus drives the passive movement device 4.

In addition, the revolution of the flywheel 5 is transmitted from the flange portion 7b to the rotor 7 (in the second power transmission system) at the same time as starting of the driving of the passive movement device 4, and thus drives the motor generator 3 as a generator. The revolution power of the engine 2 is transmitted to the rotor 7 on this occasion; however, the rotor 7 is not coupled to the input shaft 4A. In this manner, the passive movement device 4 does not apply a load to the revolution of the rotor 7, and thus the rotor 7 is free from the effects of the load fluctuation given from the passive movement device 4.

On the other hand, when the motor generator 3 is driven in addition to the driving of the engine 2, the revolution of the rotor 7 is transmitted to the flywheel 5, assists the engine power through the flywheel 5 in the first power transmission system, and is transmitted to the intermediate shaft 8 and the input shaft 4A of the passive movement device 4 through the elastic coupler 6. That is, the passive movement device 4 is driven by a combined motive power of the motive power from the first power transmission system and the motive power of the second power transmission system.

The first power transmission system from the flywheel 5 to the passive movement device 4 is isolated from the second power transmission system from the second flywheel 5 to the rotor 7, and thus the driving of the engine 2 is transmitted to the passive movement device 4 without passing through the rotor 7. In this manner, the first power transmission system and the second power transmission system do not interfere with each other.

When the torque fluctuation is caused by fluctuation of a required motive power while the passive movement device 4 is driven, an impact, the torsional vibration, and the like are generated in the first power transmission system, and then are transmitted from the input shaft 4A to the intermediate shaft 8. However, the torsional vibration and the like are dumped and absorbed by the elastic coupler 6 and are separated by the inertial force of the flywheel 5. In this manner, the transmission of the impact, the torsional vibration, and the like are significantly reduced, and thus the engine 2 and the rotor 7 are free from the negative effect generated due to the load fluctuation transmitted from the passive movement device 4.

The torsional vibration and the like transmitted from the passive movement device 4 to the rotor 7 are dumped, absorbed, and separated, and thereby the revolution detection device 14 disposed on the rotor 7 is capable of generating a revolution signal including no vibration. In this manner, the vector control to drive the motor generator 3 by the controller 15 can be controlled stably and accurately.

In addition, the intermediate shaft 8 is coupled to the input shaft 4A of the passive movement device 4 and is coupled to the flywheel 5 by the elastic coupler 6, and thereby improving the revolution accuracy of the intermediate shaft 8. And, the rotor 7 is supported by the intermediate bearing 13 and is capable of revolving with respect to the intermediate shaft 8 having a high revolution accuracy, and thereby maintaining a high revolution accuracy of the rotor 7. In this manner, that configuration suppresses fluctuation of the air gap between the rotor 7 and the stator 3a of the motor generator 3 is suppressed, the fluctuation being caused by the revolution of the rotor 7. In addition, that configuration can also suppress fluctuation of the air gap between the rotor 7 and the stator of the revolution detection device 14 such as a resolver.

The shapes and positional relations of the components according to the embodiment of the present invention will have the best configuration when configured as shown in FIG. 1. However, the shapes and positional relations are not limited to the embodiment, and thus the components and configurations may be variously modified and variously combined.

For example, the elastic coupler 6 fitted to the flywheel 5 may be configured to be extended in an axial direction, and then the rotor 7 of the motor generator 3 may be fitted to the elastic coupler 6. In addition, the circular portion 12 of the flywheel 5 may be coupled to the flange portion 7b of the rotor 7 by an elastic member or an elastic coupler.

DESCRIPTION OF THE REFERENCE NUMERAL

1 Parallel hybrid power transmission mechanism
2 Engine
2A Crank shaft
3 Motor generator
3a Stator
4 Passive movement machine
4A Input shaft
5 Flywheel
6 Elastic coupler
7 Rotor
7a Rotor boss
7b Flange portion
8 Intermediate shaft
9 Flywheel housing
9a Outer circumference portion
9b Side wall
10 Motor housing
12 Circular portion
13 Intermediate bearing
14 Revolution detection device
15 Controller

What is claimed is:

1. A parallel hybrid power transmission mechanism comprising:
    an engine;
    a crank shaft disposed on the engine;
    a motor generator;
    a passive movement device configured to receive a motive power of the motor generator;
    an input shaft disposed on the passive movement device;
    a flywheel coupled to the crank shaft;
    an elastic coupler configured to couple the flywheel to the input shaft;
    a rotor disposed on the motor generator and coupled to the fly wheel; and
    an intermediate shaft coupling the elastic coupler to the input shaft;
    wherein the parallel hybrid power transmission mechanism has,
        a first power transmission system to transmit revolution of the crank shaft through the elastic coupler from the flywheel to the intermediate shaft and the input shaft, and
        a second power transmission system to transmit the revolution of the crank shaft from the flywheel to the rotor,
    wherein the first power transmission system is isolated from the second power transmission system without interfering with each other, and
    wherein power of the engine is transmitted to the passive movement device without passing through the rotor.

2. The parallel hybrid power transmission mechanism according to claim 1, further comprising:
    an intermediate bearing rotatably supporting a rotor boss on the intermediate shaft,
    wherein the rotor includes
        the rotor boss having a hollow shape, wherein the rotor boss is arranged on an outside of a diameter of the intermediate shaft, and wherein the intermediate shaft is coupled to the flywheel by the elastic coupler.

3. The parallel hybrid power transmission mechanism according to claim 1, further comprising:

a flywheel housing surrounding the flywheel;

a motor housing surrounding the motor generator being coupled to the flywheel housing with an inside space opposed to the flywheel housing a circular portion disposed on a circumferential side of the flywheel, the circular portion being attached to a circumference of the elastic coupler; and a flange portion disposed on an end portion of the rotor, the flange portion projecting toward an outside of a diameter of the rotor, wherein the flange portion is coupled to the circular portion, and wherein the elastic coupler includes:

an inner circumference portion fitted to the intermediate shaft; and an outer circumference portion fitted to circular portion.

4. The parallel hybrid power transmission mechanism according to claim 1, further comprising:

a revolution detection device configured to detect a revolution phase of the rotor.

5. The parallel hybrid power transmission mechanism according to claim 2, further comprising:

a revolution detection device configured to detect a revolution phase of the rotor.

6. The parallel hybrid power transmission mechanism according to claim 3, further comprising:

a revolution detection device configured to detect a revolution phase of the rotor.

* * * * *